April 18, 1950        W. J. O'BRIEN        2,504,573
RADIO BEACON RECEIVER
Filed Aug. 27, 1945
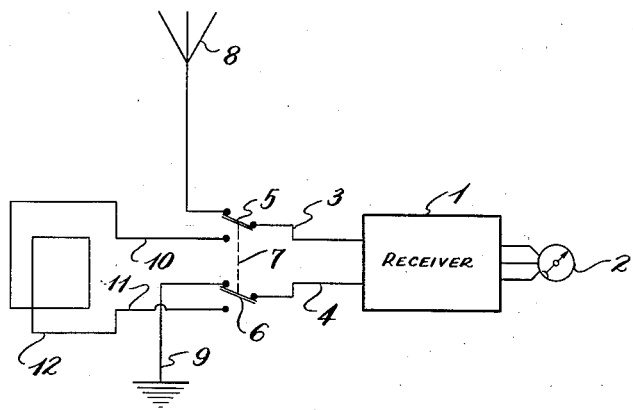
*Fig. 1*
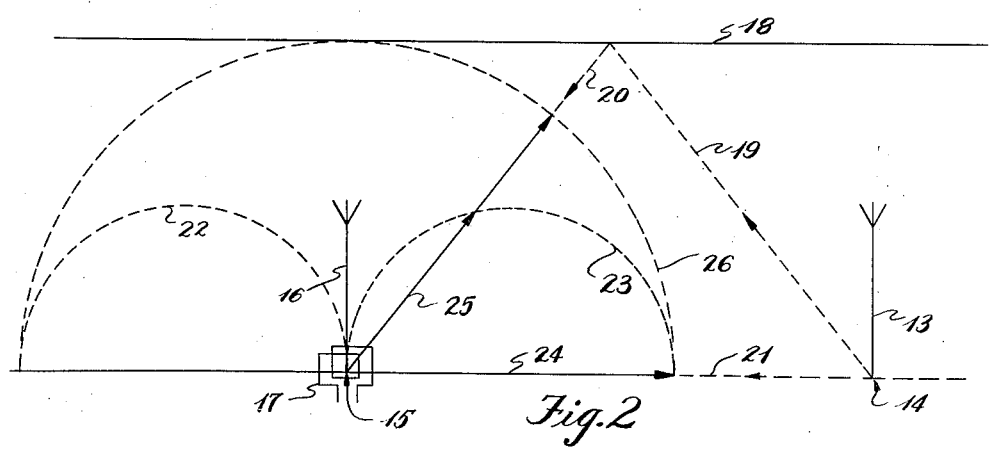
*Fig. 2*
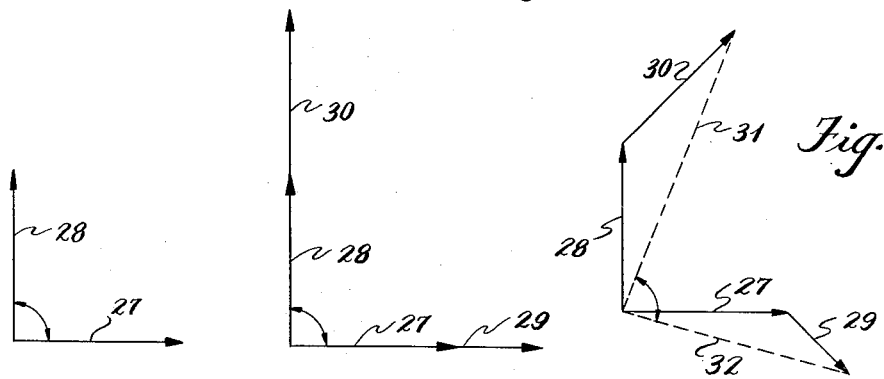
*Fig. 3*      *Fig. 4*
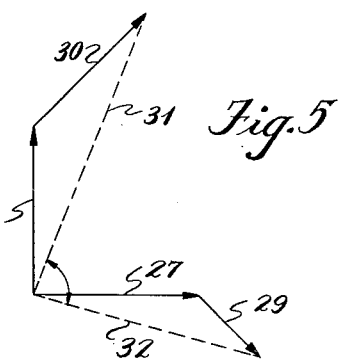
*Fig. 5*
INVENTOR.
WILLIAM J. O'BRIEN
BY
*Attorney*

Patented Apr. 18, 1950

2,504,573

UNITED STATES PATENT OFFICE 2,504,573

RADIO BEACON RECEIVER

William J. O'Brien, London, England, assignor to The Decca Record Company, Limited, London, England, a corporation of Great Britain Application August 27, 1945, Serial No. 613,000

5 Claims. (Cl. 343—105)

My invention relates to radio beacon systems and has particular reference to an improved receiving apparatus for use with beacon systems of the equi-phase displacement type, and finds particular utility when employed to detect spurious course or location indications resulting from simultaneous reception of phase displaced ground wave and sky wave signals. In my copending applications Serial No. 701,745, filed October 7, 1946, and entitled "Radio beacon system," (a continuation of abandoned application Serial No. 420,059, filed November 22, 1941, and entitled Radio beacon system) and Serial No. 612,987, filed August 27, 1945, and entitled "Radio beacon system," now abandoned, I have disclosed a radio frequency transmitting apparatus for producing equi-phase displacement radio frequency field contours together with suitable receiving apparatus for measuring the multiple phase relation existing at the location of a vehicle equipped with such receiving means between unlike but related radio frequency transmissions.

The field patterns produced by the operation of the system are intended to be defined solely by the ground wave transmission from the transmitting antenna, it being realised that if a great distance separates the transmitting apparatus and the receiver, and particularly if the apparatus is being used at night, there may also simultaneously be received sky wave signals; that is, signals which are reflected from the Heaviside or other ionised upper atmospheric layer.

Because of the varying altitude of the reflecting layer, its action with different frequencies and because of the variable distance separating the receiver from the transmitter the sky wave signals are usually not in phase with the ground wave signals. The signal which is applied to the input of the receiving apparatus is, of course, the vector sum of the ground wave and the sky wave signals so that, if the sky wave signals have an appreciable magnitude a phase shift in the received signals results and the phase relation measured by the receiving equipment is in error.

So far as is at this time known, no one has succeeded in positively limiting the reception to the ground wave signals to the complete exclusion of the sky wave signals. The present invention is, therefore, directed to a method and apparatus for checking on the character of signal received so that if sky wave signals are causing spurious and inaccurate course indications that fact at least may be ascertained and the value of the course or location indication accordingly discounted.

It is, therefore, an object of my invention to provide a method and apparatus for use with an equi-phase displacement type of radio beacon system for detecting the existence of spurious or erroneous phase indications by detecting whether or not a sky wave signal of any appreciable magnitude is being received.

It is also an object of my invention to provide a method and apparatus of the character set forth in the preceding paragraphs in which the detection is made by comparing the phase indications given for receptions through separate receiving antennae having unlike radiation characteristic patterns.

It is an additional object of my invention to provide an apparatus of the character set forth in the preceding paragraphs comprising a suitable radio beacon system receiving means, together with a pair of antennae having unlike radiation characteristic patterns together with a switching means for connecting the receiving apparatus alternately to each of the two antennae.

Other objects and advantages of my invention will be apparent from a study of the following specification read in connection with the accompanying drawings; wherein;

Fig. 1 is a schematic diagram illustrating the apparatus comprising my invention;

Fig. 2 is a diagram representing the relation between the sky wave and ground wave transmissions and the different radiation characteristic patterns of a vertical conductor antenna and a vertical loop antenna;

Fig. 3 is a vector diagram showing the phase relation between the output potentials of a vertical conductor antenna and a vertical loop antenna when receiving ground wave signals only;

Fig. 4 is a vector diagram similar to Fig. 3 but illustrating that special case of simultaneous ground wave and sky wave signal reception in which the sky waves are in phase with the ground waves; and Fig. 5 is a vector diagram similar to Figs. 3 and 4 but illustrating the phase relation between the two antennae output voltages when the sky wave signals are not precisely in phase with the ground wave signals.

Referring to the drawings, I have illustrated in Fig. 1 an apparatus suitable for the practice of my invention as comprising an equi-phase displacement type of radio beacon receiver, such receiver being represented diagrammatically in Fig. 1 by the rectangle bearing the reference character 1. This receiver may be of any suitable type but is preferably constructed in accordance with the disclosure contained in my copending application Serial No. 612,991, filed August 27, 1945, and entitled Multiple channel radio frequency receiver, now Patent 2,500,200, issued March 14, 1950. As is disclosed in that application such a receiving apparatus includes a dual channel amplifier, the two channels being respectively tuned to the two unlike but harmonically related frequencies of the two radio beacon signals radiated by the radio beacon transmitting apparatus. The outputs from the two amplifiers are fed to separate frequency converters which produce two output signals of like frequency equal to the least common multiple of the two received frequencies. The two output signals are applied to a phase discriminating circuit which operates to compare and measure the phase relationship between the two output signals. The phase discriminator circuit is connected to phase indicator 2 for indicating thereon the multiple phase relationship between the two radio frequency beacon signals of unlike but related frequencies. For example, the transmitted signals may be at frequencies of 60 and 90 kilocycles. These frequencies are separately amplified in the receiver 1, and the frequency converters serve to treble the 60 kilocycle signal and double the 90 kilocycle signal to produce two 180 kilocycle output signals. It is the phase relation between these two 180 kilocycle signals which is indicated on the phase meter 2.

It will be seen that the receiver 1 and associated phase indicator 2 comprises a receiver for measuring and indicating the multiple phase relation between beacon signals of unlike but related frequencies.

The input of receiver 1 is connected by means of conductors 3 and 4 to the blades 5 and 6 of a double pole, double throw switch indicated generally by the reference character 7. The switch contacts are so arranged that when the switch 7 is thrown to the position shown in Fig. 1 the input conductor 3 will be connected to a vertical conductor antenna represented diagrammatically at 8, while the other input conductor 4 will be connected to a ground lead 9. When the switch 7 is thrown to the alternate position the conductors 3 and 4 are extended by means of conductors 10 and 11 to a loop antenna 12 mounted in a fixed position with the plane of the loop in a vertical plane directed toward the transmitting apparatus. By this means I am permitted to connect the receiver to the antenna and ground 8 and 9 and note the phase angle on the indicator 2. Then I may throw the switch 7 to the opposite position and note the phase angle indication given by the indicator 2 when the signals are picked up by the loop antenna 12. Proper interpretation of these two readings will indicate whether or not the simultaneous reception of sky wave signals is upsetting the course or location indication given by the phase indicator 2. This may be explained by having reference to Figs. 2 through 5.

In Fig. 2 I have illustrated diagrammatically a vertical conductor transmitting antenna 13 at a location 14, and at a receiving location 15 a vertical conductor receiving antenna 16 and a vertical loop antenna 17. The upper horizontal line 18 is intended to represent a reflecting ionised upper atmospheric layer such as the Heaviside layer. The direction of sky wave transmission and reception is indicated by the dotted lines 19 and 20, whereas the dotted line 21 is intended to represent the direction of ground wave transmission. The two semicircles bearing reference characters 22 and 23 represent the radiation characteristic pattern or reception sensitivity characteristic of the vertical conductor antenna 16 and indicates that the maximum signal strength received as output from the vertical antenna 16 is from signals coming in horizontally as does the ground wave signal 21. Such signal strength is represented by the vector 24.

If the signals come from above as, for example, the incoming sky wave signal 20 the signal strength is less as is represented by the vector 25. The large dotted semicircle 26 represents the radiation characteristic pattern or reception sensitivity characteristic of the loop antenna 17 showing that the signal strength induced in the loop is substantially independent of the direction of the indicating signals in a vertical plane.

Fig. 3 illustrates the phase relation between the output potentials of the antennae 16 and 17 when the signals picked up consist solely of ground wave signals. The vector 27 represents the signal output of the vertical antenna 16, whereas the vector 28 represents the signal output of the loop antenna 17. These vectors lie precisely at right angles to each other, as is well known, when ground wave signals only are received.

In Fig. 4 I have illustrated by vector diagrams the effect of a simultaneous reception also of sky wave signals following a course such as indicated at 20 in Fig. 2 and being precisely in phase with the ground wave signal. In Fig. 4 also, the vector 27 represents the ground wave signal strength output of the antenna 16, while the vector 28 represents the ground wave signal strength of the loop 17. The vector 29 corresponds to the vector 25 of Fig. 2 and represents the signal strength induced in the vertical antenna 16 by the sky wave signals, while vector 30 represents the signal strength induced in the loop 17 by the sky wave signals. The phase relation between the vector sums of the two signals is still exactly 90°.

In Fig. 5 I have indicated the effect on the phase relationships when the sky wave signals are not precisely in phase with the ground wave signals. In Fig. 5 also, vectors 27, 28, 29 and 30 are representative respectively of the ground wave signal strengths induced in the antennae 16 and 17 and the sky wave signal strengths induced in these two antennae. It will be noted that in Fig. 5 the vectors 29 and 30 are angularly displaced from the vectors 27 and 28 to represent the out of phase relation between the sky wave signals and ground wave signals. The resultant vectors 31 and 32 are, therefore, representative of the output potentials derived from the two antennae, and it will be noted by inspection that the angle between the resultant vectors 31 and 32 is something other than 90°.

In the use of the apparatus of my invention phase angle readings are made on indicator 2 in the two described positions of the switch 7. If the two readings are different by exactly 90° one is assured that the course or location indication given by the indicator 2 is not being upset or subject to error as the result of sky wave reception. However, should the readings differ by more or less than 90° then one is warned that sky wave signals are being received and that these signals are introducing an error into the course indication given by the indicator 2. The amount by which the reading differences vary from exactly 90° may be useful in estimating the magnitude of the error which is present in the course indication. In any event the detection of the existence of an erroneous indication is of great value as it avoids the difficulty of placing an undue amount of confidence in indications which are not in fact correct. It will be noted that the apparatus required is extremely simple and that only a few seconds is required to check the operation of the apparatus to see whether or not an erroneous indication is being given.

While I have shown and described the preferred embodiment of my invention I do not desire to be limited to the details of construction which have been shown and described herein except as defined in the appended claims.

I claim:

1. An apparatus for detecting erroneous phase indications resulting from simultaneous reception of ground wave and sky wave signals from radio beacon transmitting apparatus radiating a pair of signals of unlike but harmonically related frequencies, comprising a receiver for measuring and indicating the multiple phase relation between said beacon signals of unlike but related frequencies; two antennae having different radiation characteristic patterns; and means for connecting said receiver alternately to each of said antennae.

2. The method of detecting erroneous phase indications given by a receiving apparatus used on a radio beacon system which radiates a pair of beacon signals of unlike but related frequencies and resulting from simultaneous reception of ground wave and sky wave signals, which consists in alternately receiving the beacon signals in accordance with two different reception sensitivity characteristics producing a known output phase relationship when receiving ground wave signals only, measuring the phase relations of said received signals whereby erroneous indications caused by the reception of sky wave signals is indicated by a departure of the difference between said measured phase relations from said known relationships.

3. In a radio beacon system including transmitting means for radiating a pair of beacon signals of unlike but related frequencies, an apparatus for detecting erroneous phase indications resulting from simultaneous reception of ground wave and sky wave signals, comprising a receiver for measuring and indicating the multiple phase relation between said beacon signals of unlike but related frequencies; a vertical conductor antenna; a loop antenna disposed with the plane of the loop in a vertical plane; and means for connecting said receiver alternately to each of said antennae.

4. In a radio beacon system including transmitting means for radiating a pair of beacon signals of unlike but related frequencies, an apparatus for detecting erroneous phase indications resulting from simultaneous reception of ground wave and skywave signals, comprising a receiver for measuring and indicating the multiple phase relations between said beacon signals of unlike but related frequencies; a first receiving antenna having substantially all of its receiving conductor in a vertical position, a second receiving antenna having a substantial portion of its receiving conductor in a non-vertical position, said first and second receiving antennae having a fixed known phase relation between the received signals from an all ground wave signal, and means for connecting said receiver alternately to each of said antennae.

5. In a radio beacon system including transmitting means for radiating a pair of beacon signals of unlike but related frequencies, an apparatus for detecting erroneous phase indications resulting from simultaneous reception of ground wave and skywave signals, comprising a receiver for measuring and indicating the multiple phase relation between said beacon signals of unlike but related frequencies; a receiving antenna system having a first arrangement in which substantially the whole of the receiving conductors are in a vertical position, a second arrangement in which a substantial portion of the receiving conductors are in a non-vertical position, said antenna system having a fixed known phase change in the received signals from an all ground wave signal when changed from said first arrangement to said second arrangement, and means for alternating the arrangement of said antenna system from said first arrangement to said second arrangement.

WILLIAM J. O'BRIEN.

REFERENCES CITED

The following references are of record in the file of this patent:

UNITED STATES PATENTS

| Number | Name | Date |
| --- | --- | --- |
| 2,206,637 | Koch | July 2, 1940 |
| 2,223,547 | Burrill | Dec. 3, 1940 |
| 2,256,619 | Luck | Sept. 23, 1941 |
| 2,282,030 | Busignies | May 5, 1942 |
| 2,361,953 | McDonald | Nov. 7, 1944 |
| 2,408,773 | Goodall | Oct. 8, 1946 |